(12) United States Patent
Chang et al.

(10) Patent No.: US 11,523,333 B2
(45) Date of Patent: Dec. 6, 2022

(54) PAIRING AND INTERCONNECTING METHOD BETWEEN ELECTRONIC DEVICES

(71) Applicant: Aver Information Inc., New Taipei (TW)

(72) Inventors: Chao-Hung Chang, New Taipei (TW); Chia-Feng Wu, New Taipei (TW); Jhan-Jhang Liao, New Taipei (TW); Lien-Kai Chou, New Taipei (TW); Cheng-Cheng Yu, New Taipei (TW); Cheng-Mou Tsai, New Taipei (TW); Li-Hsueh Yang, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 45 days.

(21) Appl. No.: 17/148,642

(22) Filed: Jan. 14, 2021

(65) Prior Publication Data

US 2021/0227453 A1    Jul. 22, 2021

(30) Foreign Application Priority Data

Jan. 16, 2020 (TW) ................................ 109101489

(51) Int. Cl.
*H04W 4/00* (2018.01)
*H04W 48/16* (2009.01)
*H04W 84/12* (2009.01)
*H04W 4/80* (2018.01)
*H04W 76/10* (2018.01)

(52) U.S. Cl.
CPC ............ *H04W 48/16* (2013.01); *H04W 4/80* (2018.02); *H04W 76/10* (2018.02); *H04W 84/12* (2013.01)

(58) Field of Classification Search
CPC ....... H04W 48/16; H04W 4/80; H04W 76/10; H04W 84/12
USPC .......................................... 370/329
See application file for complete search history.

(56) References Cited

U.S. PATENT DOCUMENTS

| 9,219,765 | B2* | 12/2015 | Lyle | H04L 65/80 |
| 10,347,300 | B2* | 7/2019 | Klinger | G11B 27/036 |
| 10,796,444 | B1* | 10/2020 | Raichelgauz | G06V 20/46 |
| 10,839,694 | B2* | 11/2020 | Raichelgauz | G06V 10/768 |
| 11,222,069 | B2* | 1/2022 | Raichelgauz | G06T 11/20 |
| 2010/0191608 | A1* | 7/2010 | Mikkelsen | H04L 65/607 705/26.1 |

(Continued)

*Primary Examiner* — Marceau Milord
(74) *Attorney, Agent, or Firm* — McClure, Qualey & Rodack, LLP

(57) ABSTRACT

The present invention discloses a method for pairing and interconnecting electronic devices, which cooperates with at least two electronic devices that are grouped as a transmitting end and a receiving end respectively, and the transmitting end operates in a first mode. The method for pairing and interconnecting electronic devices comprises at least Step 1 to Step 4. Step 1 refers to searching any available transmitting end in a wireless manner by the receiving end, and displaying a connection name of the transmitting end on the receiving end. Step 2 refers to prompting a dynamic operating instruction by the receiving end. Step 3 refers to executing operation by the transmitting end based on the dynamic operating instruction and thereby issuing an action instruction. Step 4 refers to receiving the action instruction by the receiving end, and establishing a connection with the transmitting end which issues the action instruction.

10 Claims, 4 Drawing Sheets

(56) References Cited

U.S. PATENT DOCUMENTS

| | | | |
|---|---|---|---|
| 2011/0021187 A1* | 1/2011 | Jayapalan | H04W 88/10 455/426.1 |
| 2011/0021213 A1* | 1/2011 | Carr | H04B 5/0031 455/26.1 |
| 2011/0081860 A1* | 4/2011 | Brown | G06F 21/35 455/41.3 |
| 2012/0088524 A1* | 4/2012 | Moldavsky | H04L 51/043 455/456.3 |
| 2013/0210353 A1* | 8/2013 | Ling | H04B 17/309 455/41.1 |
| 2014/0040363 A1* | 2/2014 | Reddy | G09B 7/02 709/204 |
| 2014/0169795 A1* | 6/2014 | Clough | H04W 88/02 398/106 |

* cited by examiner

PAIRING AND INTERCONNECTING METHOD BETWEEN ELECTRONIC DEVICES

CROSS REFERENCE TO RELATED APPLICATIONS

This Non-provisional application claims priority under 35 U.S.C. § 119(a) on Patent Application No. 109101489 filed in Republic of China on Jan. 16, 2020, the entire contents of which are hereby incorporated by reference.

BACKGROUND

1. Technical Field

The present invention relates to an interconnecting method, and particularly relates to a paring and interconnecting method between electronic devices.

2. Description of Related Art

Nowadays, with rapid progress of technology, transmission of data between electronic devices is often achieved in a wireless manner. However, prior to the data transmission being carried out, connections between such electronic devices have to be established in advance.

For example, considering E-teaching or E-learning (perform teaching or learning in a digital manner), the teacher may show or display his/her contents by means of wireless audio/video devices in a classroom, correspondingly, the students may share or present their reports for homework or term project through the wireless audio/video devices. In a general arrangement, one wireless audio/video receiving device is arranged for the use of a single teacher, whereas a plurality of wireless audio/video transmitting devices are respectively arranged for the use of a plurality of students. Nevertheless, for most existing conventional wireless audio/video receiving or transmitting devices, establishment for connections between receiving devices and transmitting devices are usually difficult to manage, which is described as follows.

In an environment for teaching or instruction, a plurality of classrooms may be disposed. Furthermore, one wireless audio/video receiving device (hereinafter referred to as "receiving device") and a plurality of wireless audio/video transmitting devices (hereinafter referred to as "transmitting device") may be designated to each classroom.

In one case, as the receiving device executes a connection software to search available transmitting devices, a display screen of the receiving device may show a device name of these available transmitting devices. In general, a default device name may refer to a list or a string of characters composed of numerals or letters, which may be shown on a tag (or label) of identity code of the device. Therefore, in order to figure out the device name of such device, the user has to check the tag (or label) of identity code on the device in a one-by-one manner, and then the user has to select corresponding transmitting device on the display screen to execute subsequent configurations.

In another case, as the receiving device executes the connection software to connect available transmitting devices through a routing device, likewise, a display screen of the receiving device may merely show a device name of these available transmitting devices but show nothing more than such device name. Therefore, the user has to query or make a look-up to device names of the available transmitting devices and then to select one transmitting device based on the device names, and finally to establish a connection.

In the above case, tags of identity code of devices usually suffer from damage or being lost, which may hinder the operation of the user. Accordingly, we now face an urgent issue about how to make pairing and interconnecting between audio/video devices in an automatic, convenient and intelligent manner, so that drawbacks and defects appearing in the above two cases may be addressed.

SUMMARY OF THE INVENTION

To address the above issues, a purpose of the present invention refers to providing a method for pairing and interconnecting electronic devices, wherein such pairing and interconnecting can be performed in an intelligent manner.

To achieve the above purpose, the present invention provides a method for pairing and interconnecting electronic devices, which cooperates with at least two electronic devices that are grouped as a transmitting end and a receiving end respectively, and the transmitting end operates in a first mode. The method for pairing and interconnecting electronic devices comprises at least Step 1 to Step 4. Step 1 refers to searching any available transmitting end in a wireless manner by the receiving end, and displaying a connection name of the transmitting end on the receiving end. Step 2 refers to prompting a dynamic operating instruction by the receiving end. Step 3 refers to executing operation by the transmitting end based on the dynamic operating instruction and thereby issuing an action instruction. Step 4 refers to receiving the action instruction by the receiving end, and establishing a connection with the transmitting end which issues the action instruction.

In one example, the dynamic operating instruction is randomly generated by the receiving end based on hardware configuration of the transmitting end.

In one example, if a plural amount of transmitting ends are in presence, the dynamic operating instruction is randomly generated by the receiving end based on an intersection of the hardware configuration of each of the plurality of transmitting ends.

In one example, if a plural amount of receiving ends are in presence, the dynamic operating instructions prompted by each of the plurality of receiving ends are different from one another.

In one example, the first mode is an access-point mode, and the receiving end directly establishes a connection with the transmitting end in a wireless manner of Wi-Fi.

In one example, further comprising Step 5 to Step 7 which are executed after the receiving end has established the connection with the transmitting end. Step 5 refers to sending a configuration data to the transmitting end by the receiving end, and thereby executing configuration by the transmitting end. Step 6 refers to terminating (or shutting off or breaking down) the connection with the transmitting end by the receiving end, and further establishing a connection with a routing device. Step 7 refers to changing to operate in a second mode by the transmitting end, and establishing a connection with the routing device.

In one example, the second mode is a station mode.

In one example, the receiving end and the transmitting end respectively establishes a connection with a routing device, and the receiving end and the transmitting end establish a connection between each other based on the routing device.

In one example, further comprising the following step executed after the receiving end has established the connection with the transmitting end: sending an audio/video data to the receiving end by the transmitting end.

In one example, the receiving end establishes the connection with the transmitting end in a wireless manner of Wi-Fi or Bluetooth.

In one example, the action instruction issued by the transmitting end changes the connection name of the transmitting end displayed by the receiving end.

Based on the above, method for pairing and interconnecting electronic devices of the present invention firstly utilizes a specific dynamic operating instruction randomly generated by an electronic device at the receiving end, and thereafter executes corresponding operating procedure by an electronic device at the transmitting end based on the dynamic operating instruction and hence can automatically recognize the transmitting end by the receiving end. In this manner, the receiving end and the transmitting end can pair and interconnect with each other, and such pairing and interconnecting procedure can thus be simplified.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

The following disclosures, with reference to corresponding figures, provide detail descriptions for preferable embodiments of the pairing and interconnecting method for electronic devices in the present invention. Furthermore, reference will be made to the drawings to describe various inventive embodiments of the present disclosure in detail, wherein like numerals refer to like elements throughout.

Figure 1:
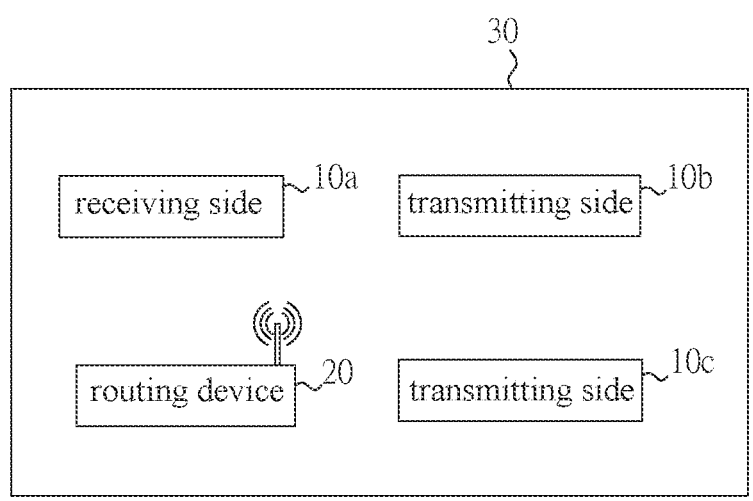
FIG. 1 illustrates a schematic block diagram showing a hardware structure corresponding to a pairing and interconnecting method between electronic devices of the present invention.

FIG. 1 illustrates a schematic block diagram showing a hardware structure corresponding to a pairing and interconnecting method between electronic devices of the present invention. Referring to FIG. 1, the method for pairing and interconnecting (also termed as "connecting and matching" or "connecting and mating") between electronic devices of the present invention, which corresponds to a plurality of electronic devices 10a-10c and a routing device 20. In this embodiment, the pairing and interconnecting method of the present invention is used for, as an example, performing teaching, tutoring or learning within a classroom 30. Wherein, these electronic devices 10a-10c are grouped as (divided into two groups of) a receiving end and a transmitting end. In practice, the electronic device 10a at the receiving end (also termed as "receiving side") may be manipulated or operated by a teacher, whereas the electronic devices 10a-10c at the transmitting end (also termed as "transmitting side") may be manipulated or operated by at least one student. The receiving end 10a may refer to, for example, tablet computers or laptop computers. On the other hand, the transmitting end 10b-10c may refer to wireless audio/video devices such as cameras or document cameras/projectors for real objects (i.e., real things, real matters or actual products).

Figure 2:
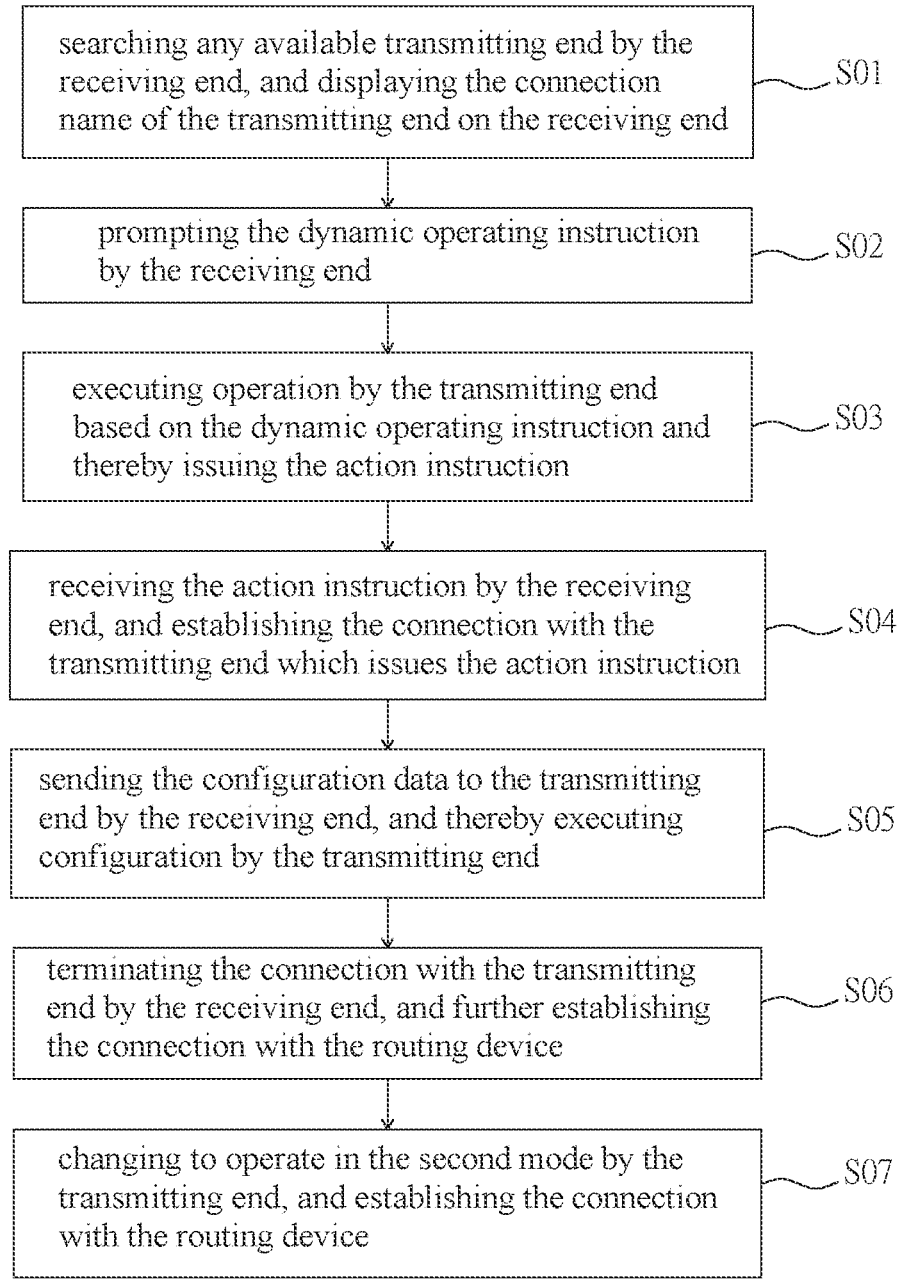
FIG. 2 illustrates a flowchart of a pairing and interconnecting method between electronic devices in accordance with a first embodiment of the present invention.

FIG. 2 illustrates a flowchart of a pairing and interconnecting method between electronic devices in accordance with a first embodiment of the present invention, and the following descriptions can be better understood with reference to FIG. 2. Now referring to FIG. 2, the pairing and interconnecting method between electronic devices of the first embodiment of the present invention comprises step S01 to step S07. In this embodiment (the first embodiment), pairing and interconnecting method for the receiving end 10a and the transmitting end 10b-10c is described, wherein the transmitting end 10b-10c may operate in a first mode without any connection to the routing device 20. Such a first mode may refer to, for example, an AP mode (Access point mode).

Specifically, in step S01, the receiving end 10a may search, seek or locate any available one (anyone that is available for establishing connection) of the transmitting end 10b-10c, in a wireless manner (by means of wireless accessing). Furthermore, an item name or item title of such a connection (hereinafter referred to as "connection name") of the transmitting end may be shown or displayed on the receiving end 10a. More particularly, the receiving end 10a may execute a software for establishing a connection (hereinafter referred to as "connection software", also termed as "connection application" or "connection program" or other like terminology). As such a connection software being under execution, any electronic device being operated in the AP mode and being located within the accessible range by the searching signal, can be searched and found by the receiving end 10a. Thereafter, the resultant connection names, which are obtained by searching results, may be shown or displayed on a panel or display screen of the receiving end 10a. In one case for real practice, the receiving end 10a may locate and found any other devices than the transmitting end 10b-10c, therefore in this case connection names of such devices (other than the transmitting end 10b-10c) may also be shown the same panel or display screen of the receiving end 10a. Moreover, one skilled in this art would understand that, the wireless protocol and transmission scheme utilized by the receiving end 10a to search any available transmitting end 10b-10c, may include (but not limited to) any type of wireless technology such as Wi-Fi, Bluetooth or any other short-range transmission scheme.

Next, in step S02, a dynamic operating instruction may be issued or prompted by the receiving end 10a. Specifically, the receiving end 10a may perform a comparison between the connection name and a database, so as to ensure type number of each of the found transmitting ends 10b-10c (which are found by the receiving end 10a during step 01). Then, the receiving end 10a may generate a dynamic operating instruction in a random manner, based on the hardware configuration corresponding to each confirmed type number.

In this embodiment, the transmitting ends 10b-10c may refer to devices of different type numbers.

Such a hardware configuration may exemplarily refer to buttons. For example, the transmitting end 10b may be equipped with a "zoom in" button and a "zoom out" button, whereas the transmitting end 10c may be equipped with a "zoom in" button, a "zoom out" button, an "auto focus" button and a "lamp" button, etc. Furthermore, the dynamic operating instruction prompt generated by the receiving end 10a may refer to an operating behavior (also termed as "action"), such as, showing text "please push the "zoom in" button to establish a connection" on the display screen of the connection software.

Notably, the transmitting end 10b and transmitting end 10c may have different arrangements for their button configuration, therefore, the dynamic operating instruction must be selected from intersection constituted by all buttons of the transmitting ends 10b and 10c. in other words, the dynamic operating instruction which is randomly generated by the receiving end 10a must be executable on all of the transmitting ends 10b~10c.

Furthermore, the database may be stored in the connection software, and the database may comprise a look-up table to record information of button configuration corresponding to each type of electronic device. Moreover, new hardware information may be added by automatically updating or manually updating.

In addition, to avoid malfunction caused by erroneously trigger and execute dynamic operating instruction by other transmitting ends, limit for timing may be employed on the dynamic operating instruction. For example, the dynamic operating instruction may refer to "please push the "zoom in" button and stay for 3 seconds to establish connection", and in this way, malfunction caused by erroneously triggering can be significantly reduced.

Next, in step S03, the transmitting end 10b may perform operations according to the dynamic operating instruction, and thereby issue an action instruction. In this embodiment, the user may push the "zoom-in" button on the transmitting end 10b, and thereafter, the transmitting end 10b may issue the action instruction and send it to the receiving end 10a. In this embodiment, the action instruction may refer to, for example, changing connection name of the transmitting end 10b.

Next, in step S04, the receiving end 10a may receive the action instruction and establish connection to the transmitting end 10b which sends the action instruction. More particularly, the action instruction sent by the transmitting end 10b refers to changing connection name of the transmitting end 10b, therefore, the new connection name of the transmitting end 10b may be shown on the display screen of the connection software of the receiving end 10a. In this manner, the receiving end 10a may be able to identify that the connection is desirably to be established to the transmitting end 10b, hence the receiving end 10a may establish connection to the identified transmitting end 10b. Wherein, establishment for the connection between the receiving end 10a and the transmitting end 10b can be automatically done after the receiving end 10a discovers new connection name. Not intending to be limited by the above example, alternatively, the above-mentioned establishment for the connection can also be achieved by selecting new connection name in the connection software of the receiving end 10a (that is selected by the user).

In addition, in more details, specific characters can be added to the new connection name shown on the display screen of the connection software of the transmitting end 10b, according to dynamic operating instruction. In this manner, the user or the receiving end 10a may be able to identify and determine desired transmitting end to which connection is intended to be established. In this embodiment, specific characters such as (but not limited to) "zoom in" can be added to the new connection name of the transmitting end 10b.

Note that the receiving end 10a has established connection with the routing device 20 in advance. Therefore, prior to step S04 where the receiving end 10a tends to establish connection with the transmitting end 10b, connection that has been established with the routing device 20 must be terminated (or shut off or broken down).

Next, in step S05, the receiving end 10a may transmit a configuration data to the transmitting end 10b, and the transmitting end 10b may hence perform configuration base on the configuration data. Specifically, the receiving end 10a may transmit corresponding configuration data, which is relative to the connection with the routing device 20, to the transmitting end 10b. Wherein, such a configuration data may include, but not limited to, domain name, password of the routing device 20 and equipment name of the transmitting end 10b as it works in a station mode.

Next, in step S06, the receiving end 10a may terminate the connection with the transmitting end 10b, and thereafter the receiving end 10a may establish connection with the routing device 20.

Next, in step S07, the transmitting end 10b may change its operating mode to operate in a second mode, wherein the transmitting end 10b may raise an establishment for a connection with the routing device 20 based on the previously received configuration data. In more detail, after the receiving end 10a terminated the connection with the transmitting end 10b, the transmitting end 10b may directly change to operate in the station mode. In such a station mode, the transmitting end 10b may change its equipment name based on the configuration data. Further, the transmitting end 10b may directly make connection with the routing device 20 based on the domain name and password of the routing device 20 contained in the configuration data.

Figure 3:
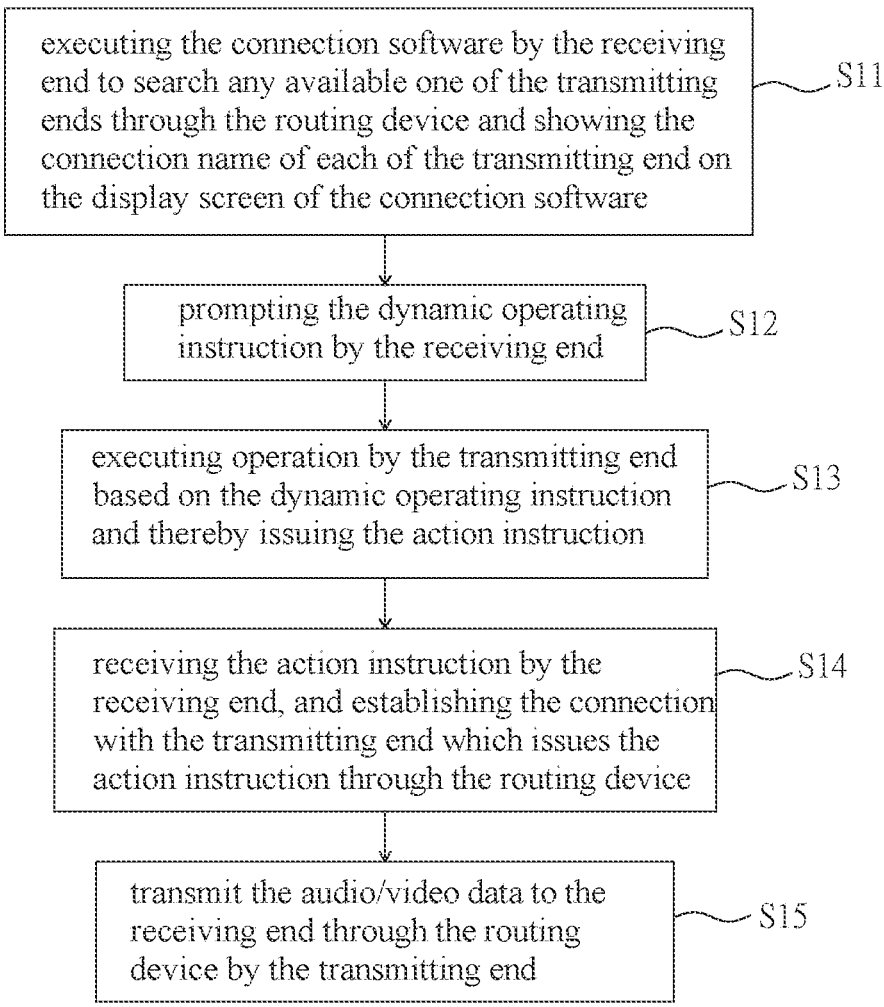
FIG. 3 illustrates a flowchart of a pairing and interconnecting method between electronic devices in accordance with a second embodiment of the present invention.

Notably, the above-mentioned steps S01 to S07 may be repeatedly executed so that the transmitting end 10c can also establish connection with the routing device 20. In addition, after transmitting end (e.g. the transmitting end 10c) has been connected (e.g. communicatively connected or logically connected) with routing device (e.g. the routing device 20), transmitting end may send data, through a connecting-path via routing device, to an electronic device of receiving end. In the following descriptions, a second embodiment of the present invention will be disclosed by reference to FIG. 3 to describe and explain how the receiving end 10a pass data (e.g. send data to or receive data from) the transmitting end 10b-10c through the routing device 20.

More particularly, the transmitting end 10b-10c herein may operate in the station mode, and each one of the receiving end 10a and the transmitting end 10b-10c may be connected (e.g. communicatively connected) with the routing device 20. A pairing and interconnecting method between electronic devices of the second embodiment comprises steps S11-S15.

First of all, in step S11, the receiving end 10a may execute the connection software, so that the receiving end 10a may search and locate any available one (i.e., one that can be connected by the receiving end 10a) of the transmitting end 10b-10c, through the routing device 20, in a wireless manner. Furthermore, connection names of each of the transmitting end 10b-10c may be shown on a display screen of the connection software.

Next, in step S12, a dynamic operating instruction may be issued or prompted by the receiving end 10a. For simplicity, detailed descriptions for step S12 are omitted herein since step S12 performs the same as step S02 (see the first embodiment), and those descriptions can be found in foregoing paragraph which states step S02.

Next, in step S13, the transmitting end 10b may perform or execute operations according to the dynamic operating instruction, and thereby the transmitting end 10b may issue an action instruction. For simplicity, detailed descriptions for step S13 are omitted herein since step S13 performs the same as step S03 (see the first embodiment).

Next, in step S14, the receiving end 10a may receive the action instruction and establish a connection, through the routing device 20, to the transmitting end 10b which sends the action instruction. Unlike step S04 of the first embodiment, the receiving end 10a maintains or keeps its connection (which won't be terminated) with the routing device 20 in step S14 of the second embodiment.

Next, in step S15, the transmitting end 10b may transmit an audio/video data to the receiving end 10a through the routing device 20, and such an audio/video data may be shown on a display screen of the receiving end 10a.

From the above disclosures of the first and second embodiments, electronic devices at the receiving end may be able to assist or facilitate establishment of connection between the routing device and electronic devices at the transmitting end in a convenient and intelligent manner. Furthermore, corresponding transmitting end may correctly and clearly send audio/video data to the receiving end.

Figure 4:
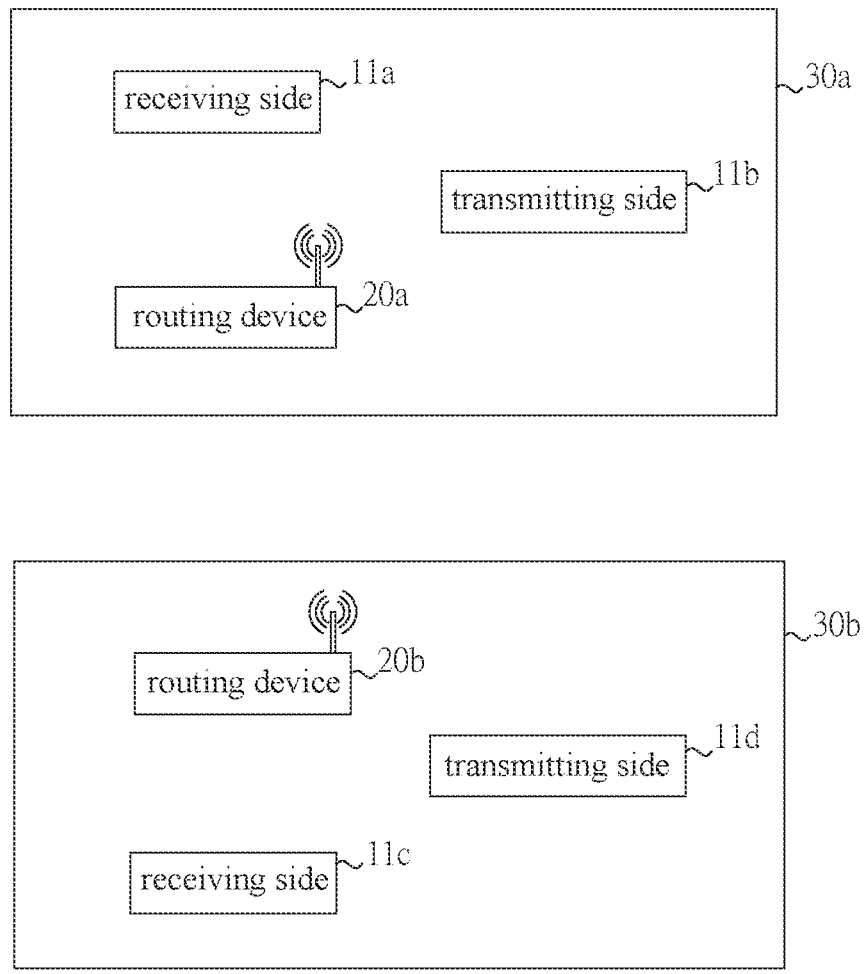
FIG. 4 illustrates a schematic block diagram showing a hardware structure corresponding to a pairing and interconnecting method between electronic devices in accordance with a third embodiment of the present invention.

In the following paragraphs, detailed descriptions for the third embodiment will be provided by reference to FIG. 4, which present an example of multiple electronic devices at the receiving end (i.e., the receiving end has more than one electronic devices). Similar to the first embodiment, the third embodiment also presents or discloses a pairing method between the transmitting end and the receiving end. However, the third embodiment shows some differences from the first embodiment that, the pairing method of the third embodiment may be applied to an environment having two classrooms. In the third embodiment, the first classroom 30a may include a receiving end 11a, an transmitting end 11b and a routing device 20a, whereas the second classroom 30b may include a receiving end 11c, an transmitting end 11d and a routing device 20b.

Specifically, in the third embodiment, the dynamic operating instruction must be selected from intersection of all buttons of the transmitting end 11b and the transmitting end 11d. In addition, the third embodiment may present a different manner from the first embodiment that, in order to avoid redundant connection (i.e., same connections are established more than twice), the receiving ends 11a and 11c in the third embodiment cannot issue same dynamic operating instruction simultaneously. Accordingly, prior to random generation of the dynamic operation instruction, the receiving ends 11a and 11c have a necessary to inform each other in advance, so as to ensure different dynamic operating instructions to be generated respectively. More particularly, after execution of connection software by the receiving end 11a of the first classroom 30a, the receiving end 11a may be able to search and locate the transmitting ends 11b and 11d simultaneously. Likewise, the receiving end 11c of the second classroom 30b may be able to seek, search or locate the transmitting ends 11b and 11d simultaneously. Furthermore, the sought transmitting ends 11b and 11d may be shown on display screen of connection software of the receiving ends 11a and 11c, respectively. Concerning the above situation, consequently, the dynamic operating instruction issued by receiving end 11a must be different from that issued by receiving end 11c, so as to ensure all connections (all connections between any entity of the transmitting end and receiving end) are established in a correct manner.

Notably, in the third embodiment, each of two classrooms may utilize an individual routing device, respectively. However, not limited by the above arrangement of the third embodiment, alternatively in other embodiments, receiving end and transmitting end of two classrooms may also be connected with the same routing device, simultaneously.

With the foregoing descriptions for all embodiment of the present invention, it is disclosed a pairing and interconnecting method between electronic devices. In such a pairing and interconnecting method, the electronic device at receiving end may randomly generate specific dynamic operating instructions, and thereafter, corresponding electronic device at transmitting end may execute correspond operation based on the specific dynamic operating instructions, which can thereby allow the receiving end to automatically identify or recognize the transmitting end. In this manner, the receiving end may be able to send configuration data to the transmitting end (or even to perform configuration on the transmitting end). Also, the transmitting end may send audio/video data to the receiving end. For all the above situations of the present invention, better and simplified procedures may be obtained to perform pairing and interconnecting.

The foregoing descriptions for all embodiment as disclosed are merely for exemplary and explanatory purposes, but are not intended to limit or depart from the scope and spirit of the present invention. Any change or modification to the foregoing descriptions and embodiments which still maintain their equivalents, should all be enclosed or covered by the scope of the appended claims.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A method for pairing and interconnecting electronic devices, which cooperates with at least two electronic devices that are grouped as a transmitting end and a receiving end respectively, and the transmitting end operates in a first mode, comprising:

searching any available transmitting end in a wireless manner by the receiving end, and displaying a connection name of the transmitting end on the receiving end;

prompting a dynamic operating instruction by the receiving end;

executing operation by the transmitting end based on the dynamic operating instruction and thereby issuing an action instruction; and receiving the action instruction by the receiving end, and establishing a connection with the transmitting end which issues the action instruction, wherein if a plural amount of transmitting ends exist, the dynamic operating instruction is randomly generated by the receiving end based on an intersection of hardware configuration of each of the plurality of transmitting ends.

2. The method for pairing and interconnecting electronic devices of claim 1, wherein the dynamic operating instruction is randomly generated by the receiving end based on hardware configuration of the transmitting end.

3. The method for pairing and interconnecting electronic devices of claim 1, wherein if a plural amount of receiving ends exist, the dynamic operating instructions prompted by each of the plurality of receiving ends are different from one another.

4. The method for pairing and interconnecting electronic devices of claim 1, wherein the first mode is an access-point mode, and the receiving end directly establishes a connection with the transmitting end.

5. The method for pairing and interconnecting electronic devices of claim 4, further comprising the following steps executed after the receiving end has established the connection with the transmitting end:

sending a configuration data to the transmitting end by the receiving end, and thereby executing configuration by the transmitting end;

terminating the connection with the transmitting end by the receiving end, and further establishing a connection with a routing device; and changing to operate in a second mode by the transmitting end, and establishing a connection with the routing device.

6. The method for pairing and interconnecting electronic devices of claim 5, wherein the second mode is a station mode.

7. The method for pairing and interconnecting electronic devices of claim 1, wherein the receiving end and the transmitting end respectively establishes a connection with a routing device, and the receiving end and the transmitting end establish a connection between each other based on the routing device.

8. The method for pairing and interconnecting electronic devices of claim 7, further comprising the following step executed after the receiving end has established the connection with the transmitting end:

Sending an audio/video data to the receiving end by the transmitting end.

9. The method for pairing and interconnecting electronic devices of claim 1, wherein the receiving end establishes the connection with the transmitting end in a wireless manner of Wi-Fi or Bluetooth.

10. The method for pairing and interconnecting electronic devices of claim 1, wherein the action instruction issued by the transmitting end changes the connection name of the transmitting end displayed by the receiving end.

\* \* \* \* \*